United States Patent [19]
Kudoh et al.

[11] Patent Number: 5,144,602
[45] Date of Patent: Sep. 1, 1992

[54] MAGNETO-OPTICAL INFORMATION RECORDING METHOD AND APPARATUS IN WHICH A LASER BEAM OSCILLATES IN A TRACK-WIDTH DIRECTION

[75] Inventors: Yoshihiko Kudoh, Yawata; Norio Miyatake, Kobe, both of Japan

[73] Assignee: Matsushita Electric Industrial Co., Ltd., Osaka, Japan

[21] Appl. No.: 473,397

[22] Filed: Feb. 1, 1990

[51] Int. Cl.⁵ .................. G11B 13/04; G11B 11/12
[52] U.S. Cl. .................. 369/13; 369/44.13; 369/110; 369/112
[58] Field of Search ............ 369/13, 112, 109, 111, 369/110, 44.13; 360/114, 59; 365/122; 250/201.4

[56] References Cited

U.S. PATENT DOCUMENTS

| | | | |
|---|---|---|---|
| 4,791,627 | 12/1988 | Yonezawa | 369/109 |
| 4,802,153 | 1/1989 | Kataoka et al. | 369/112 |
| 4,886,958 | 12/1989 | Merryman et al. | 250/201.4 |
| 4,907,211 | 3/1990 | Horimai et al. | 360/114 |
| 4,949,331 | 8/1990 | Maeda et al. | 369/109 |

FOREIGN PATENT DOCUMENTS 57-78653  5/1982  Japan .................. 360/59

Primary Examiner—Hoa Nguyen
Attorney, Agent, or Firm—Wenderoth, Lind & Ponack

[57] ABSTRACT

By performing a recording operation and an erasing operation while oscillating a position of a laser beam irradiation on an optical recording medium in a direction perpendicular to the track direction, an improvement in the S/N ratio during reproduction and a reduction of jitter in the detecting signal are attained. As an element for oscillating the laser beam irradiation position in the direction perpendicular to the track direction, an acousto-optical deflector or an electro-optical deflector is used.

8 Claims, 3 Drawing Sheets

MAGNETO-OPTICAL INFORMATION RECORDING METHOD AND APPARATUS IN WHICH A LASER BEAM OSCILLATES IN A TRACK-WIDTH DIRECTION

BACKGROUND OF THE INVENTION

1. Field of the Invention

The present invention relates to an optical recording method and apparatus for recording information on an optical recording medium by utilizing a laser beam.

2. Description of the Prior Art

According to the recording method of a conventional optical recording method, recording is performed by irradiating a laser beam on an optical recording medium to induce local temperature elevation or chemical change of the laser beam irradiated area by light absorption. For reproducing, a laser beam having a differnt intensity or wavelength from that used in recording is irradiated on the optical recording medium to detect the local change on the optical recording medium induced by recording from the change in reflected light or transmitted from the optical recording medium.

To describe in detail the recording method on a magneto-optical recording medium out of the optical recording media, recording is performed thermomagnetically by inducing local temperature elevation on a magneto-optical recording medium by irradiation with laser beam, and reproduction is performed by detecting the direction of magnetization in the recorded area by irradiating a weak laser beam having a linear polarization state by utilizing a Kerr effect or Faraday effect (i.e., magneto-optical effect) arrangement.

Furthermore, the recording systems include the following two systems: one being a system to perform recording by modulating the recording laser beam intensity in accordance with the recording signal under a certain recording magnetic field (in the case of an optical recording medium other than the magneto-optical recording medium, the recording magnetic field is unnecessary) (referred to as an optical modulation recording system), and the other being a system to be used for the magneto-optical recording medium only, for performing recording by modulating the direction of the recording magnetic field according to the recording signal under a certain recording laser beam intensity (referred to as a magnetic field modulation recording system).

In the conventional optical modulation recording system and the conventional magnetic field modulation recording system, when a high frequency recording signal is recorded, the shape of the recorded domain becomes as shown in FIGS. 7 and 8, respectively. More specifically, in the optical modulation recording system, the area of each recorded domain is smaller than the area of the reproducing laser beam spot as shown in FIG. 7, so that the amplitude of the reproduction signal is not adequately large, or the S/N ratio of the reproduced signal is low. In the magnetic field modulation recording system, each recorded domain has horn-like extended portions as shown in FIG. 8 which can be undesirably detected when the reproducing laser beam spot is positioned at an area between recorded domains. This reduces the S/N ratio of the reproduced signal and causes unwanted jitter in the reproduced signal.

SUMMARY OF THE INVENTION

An object of the present invention is to provide an optical recording method which can form a recorded domain which has a sufficiently broad width with respect to the reproduced laser beam spot area and shows small shape disturbances such as angular projections formed at the terminal portions thereof, so as to obtain a high reproduction S/N ratio and so as to reduce the generation of jitter in detecting signals.

In order to attain the above object, in the present invention there is used a means for oscillating the laser beam projection position on the optical recording medium in a direction perpendicular to the track direction during recording and erasing operations. In this case, it is desirable for the oscillation frequency f to be sufficiently fast in comparison with the relative moving velocity v of the optical recording medium to the laser beam in the track direction, i.e., to satisfy the condition of oscillating by more than 1 cycle to the recorded domain of not exceeding 1 $\mu$m: $f > v$ ($\mu$m/s)/1 ($\mu$m).

By the abovementioned construction, the width of the heating area on the optical recording medium is extended in the direction perpendicular to the track direction during the recording operation, with the result that the recorded domain width is extended and a high reproduction S/N ratio is obtainable. Furthermore, due to lessening of the temperature distribution difference in the heating area and suppression of disturbances in shape generated at the end portion of the recorded domain, the generation of jitter in the signal detection can also be reduced. On the other hand, during the erasing operation, full erasing of the domain recorded as above becomes feasible.

As described above, when recording and erasing of the optical recording medium are preformed using the optical recording method of the present invention, a high reproduction S/N ratio is obtainable, and the generation of jitter in detecting signals can be reduced.

DESCRIPTION OF THE PREFERRED EMBODIMENTS

Figure 1:
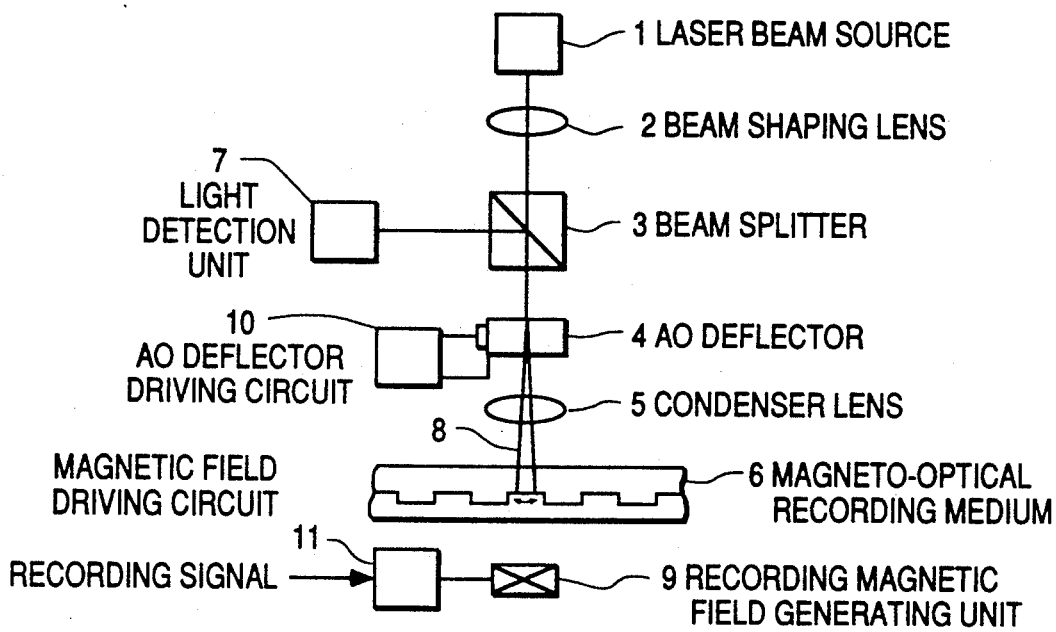
FIG. 1 is a view of an optical system to be used for an optical recording method in accordance with a first embodiment of the present invention.

FIG. 1 is a view of an optical system to be used for an optical recording method in accordance with a first embodiment of the present invention. This embodiment shows a case of performing recording on a magneto-optical recording medium by a magnetic field modulation recording method. In FIG. 1, element 1 is a laser light source; element 2 is a beam shaping lens; element 3 is a beam splitter; element 4 is an acousto-optical deflector (AO deflector) such as one of LiNbO$_3$; element 5 is a condenser lens; element 6 is a magneto-optical recording medium having a recording film such as one of TbFeCo; element 7 is a light detection unit; element 8 is a laser beam whose irradiation position is vibrating; element 9 is a recording magnetic field generating unit; element 10 is a driving circuit for driving the AO deflector, and element 11 is a magnetic field driving circuit for providing a recording magnetic field whose orientation is modulated according to a recording signal. In this case, the AO deflector causes the light to deflect by utilizing a medium on which a refractive index distribution has been formed by sound wave transmission as a diffraction grating.

A laser beam emitted from the laser light source 1 and passed through the beam shaping lens 2 and the beam splitter 3 is injected into the AO deflector 4 which is driven by frequency modulation under the condition of the central frequency of 50 MHz and the modulation frequency of 3 MHz by the driving circuit 10 to obtain a laser beam 8 whose irradiation position on the magneto-optical recording medium 6 which moves in the track direction at a velocity of 2.5 m/s oscillates in a direction perpendicular to the track direction. This oscillating laser beam 8 is irradiated on the magneto-optical recording medium 6 through the condenser lens 5 and the width of the heating area on the magneto-optical recording medium 6 is extended in the direction perpendicular to the track direction. At this time the recording magnetic field generating unit 9 has generated a magnetic field modulated by the magnetic field driving circuit 11 according to the recording signal of 1.5 MHz. As a result of the above, the area having a small temperature distribution difference in the heated area by the laser beam is extended, and a recorded domain which has little shape disturbance at the end portion thereof is obtainable. The light detection part 7 detects the reflected light from the magneto-optical recording medium separated from the incident light by the beam splitter 3 to perform a focusing control and tracking control of the laser beam and a detect the signal from the recorded domain on the magneto-optical recording medium during reproduction.

Figure 2:
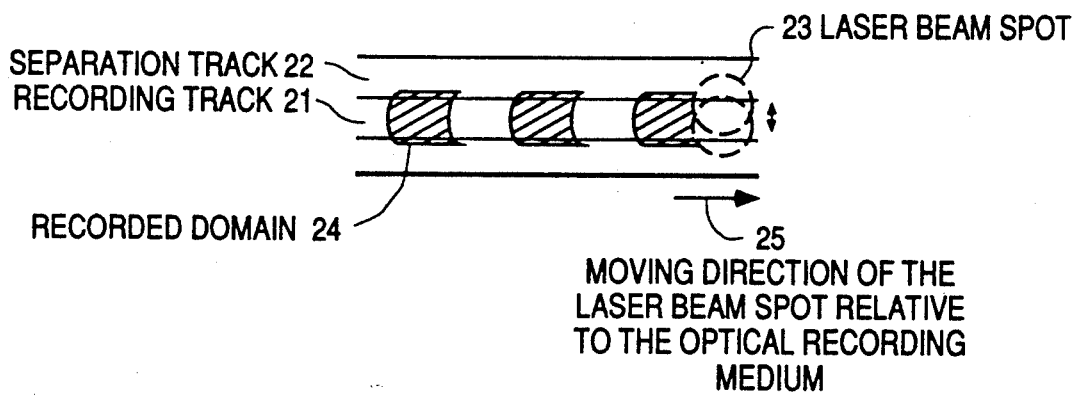
FIG. 2 is a view showing a recorded domain and a vibration state of a laser beam when recording is performed by a magnetic field modulation recording method according to the optical recording method in accordance with the first embodiment of the present invention.
Figure 5:
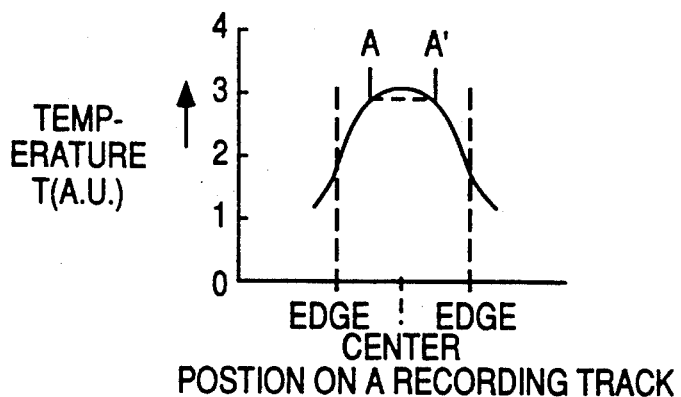
FIG. 5 is a graph showing the temperature distribution in the direction perpendicular to the track direction of the heating area by the laser beam on an optical recording medium according to the optical recording methods in accordance with the first and second embodiments of the present invention.
Figure 6:
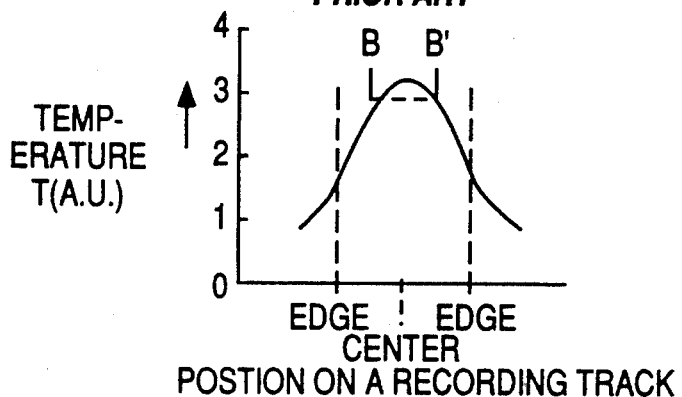
FIG. 6 is a graph showing the temperature distribution in the direction perpendicular to the track direction of the heating area by the laser beam on an optical recording medium according to the conventional optical recording method.
Figure 7:
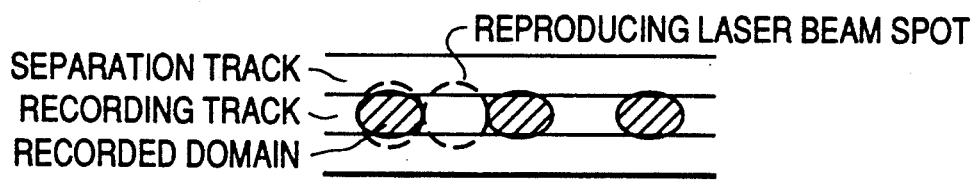
FIG. 7 is a view showing a domain shape recorded by an optical modulation recording method according to the conventional optical recording method.
Figure 8:
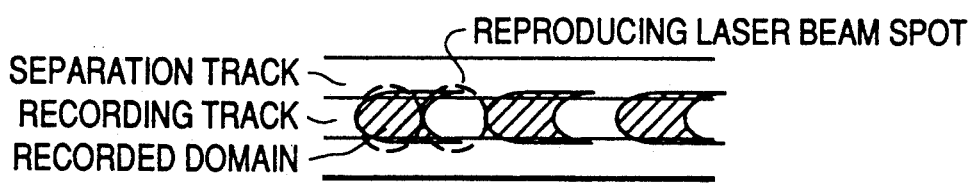
FIG. 8 is a view showing a domain shape recorded by a magnetic field modulation recording method according to the conventional optical recording method.

FIG. 2 shows a shape of the recorded domain on the magneto-optical recording medium and the oscillation state of the laser beam when recording is performed by a magnetic modulation recording method according to the optical recording method of the first embodiment. In FIG. 2, element 21 is a track for recording having a width of 0.8 μm on the magneto-optical recording medium; element 22 is a separation track having a width of 0.8 μm for separating the adjacent track for recording; element 23 is a laser beam spot which shows relative movement to the magneto-optical recording medium at the velocity of 2.5 m/s while oscillating at 3 MHz; element 24 is a recorded domain, and element 25 is a relative moving direction of the laser beam spot. FIG. 5 and FIG. 6 respectively show the temperature distribution in the direction perpendicular to the track direction of the heating area by the laser beam on a magneto-optical recording medium according to the optical recording method of the first embodiment and the temperature distribution in the direction perpendicular to the track direction of the heating area by the laser beam on a magneto-optical recording medium according to the conventional optical recording method. When the laser beam spot 23 is caused to make relative movements on the track for recording 21 in the track direction while oscillating in the direction perpendicular to the track direction in an oscillation width of about 0.3 μm which does not affect the adjacent track for recording, there can be obtained a recorded domain in which the generation of shape disturbances at the end portion thereof is suppressed as shown in FIG. 2. This is because of the fact that, from the comparison between FIG. 5 and FIG. 6, the width of the heating area is extended in the direction perpendicular to the track direction in comparison with the case of recording by the conventional optical recording method, and at the same time, the range in which the temperature distribution difference of the heating areas is small (the range A-A' in FIG. 5 and the range B-B' in FIG. 6) is extended.

As a result, the reproduction S/N ratio at a minute recorded domain diameter of not exceeding 1 μm is improved, and the generation of jitter in signal detection can be reduced.

In the present embodiment, an AO deflector such as one of LiNbo$_3$ has been used as a deflector for the laser beam. However, a similar effect is obtainable by the use of an electro-optical deflector (EO deflector) of LiTaO$_3$ or the like.

Figure 3:
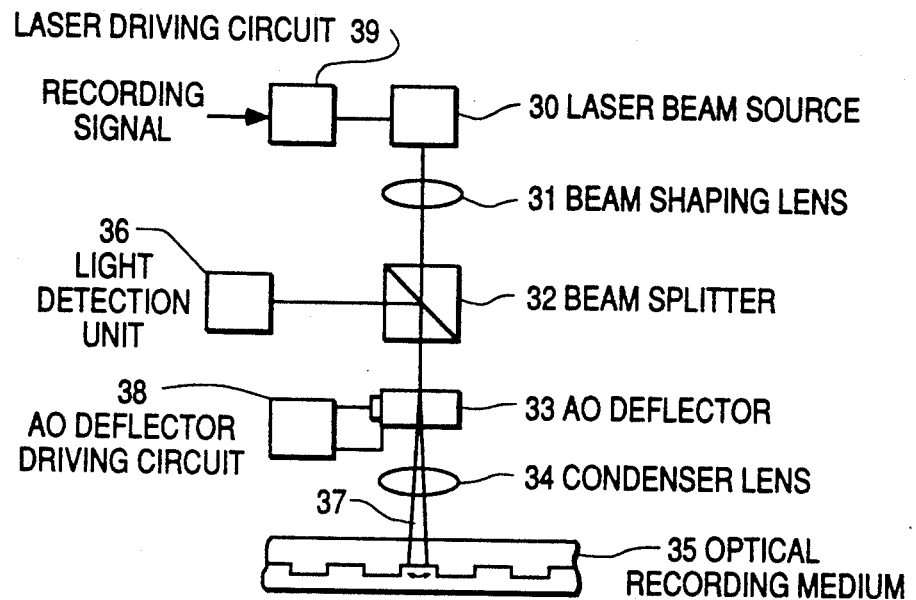
FIG. 3 is a view of an optical system to be used for an optical recording method in accordance with a second embodiment of the present invention.
Figure 4:
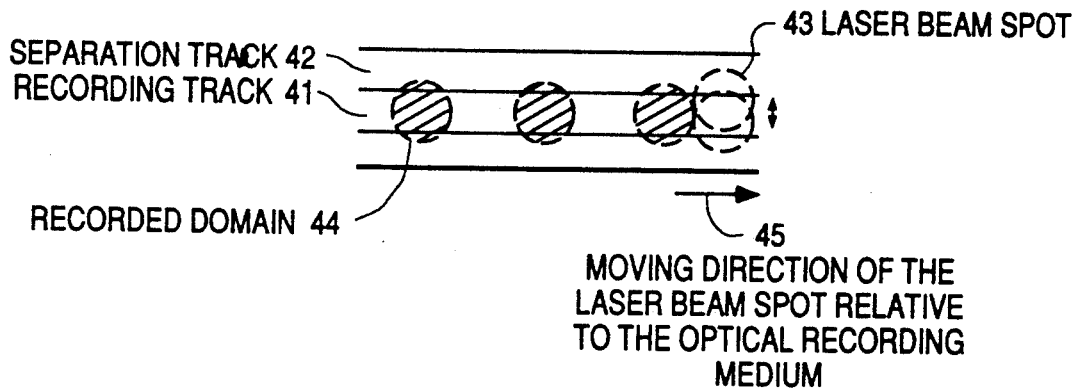
FIG. 4 is a view showing a recorded domain and a vibration state of a laser beam when recording is performed by an optical modulation recording method according to the optical recording method in accordance with the second embodiment of the present invention.

FIG. 3 is a view of an optical system to be used for the optical recording method in accordance with a second embodiment of the present invention. In FIG. 3, element 30 is a laser light source; element 31 is a beam shaping lens; element 32 is a beam splitter; element 33 is an acousto-optical deflector (AO deflector) of LiNbO$_3$ or the like; element 34 is a condenser lens; element 35 is an optical recording medium having a recording film such as one of TeOx (X≈1) or the like; element 36 is an optical detection part; element 37 is a laser beam whose irradiation position is oscillating; element 38 is a driving circuit for the AO deflector, and element 39 is a laser driving circuit for subjecting the laser beam to intensity modulation according to the recording signal. The recording laser beam emitted from the laser light source 30 is subjected to intensity modulation according to the recording signal of 1.5 MHz. The laser beam for recording emitted from the laser light source 30 and passed through the beam shaping lens 31 and the beam splitter 32 is injected into the AO deflector 33 which has been subjected to frequency modulation driving under the conditions of the central frequency of 50 MHz and the modulation frequency of 3 MHz by the driving circuit 38 to obtain a laser beam 37 which moves in the track direction at a velocity of 2.5 m/s and in which the irradiation position on the optical recording medium 35 oscillates in the direction perpendicular to the track direction. The resulting oscillating laser beam 37 is projected to the optical recording medium 35 through a condenser lens 34 to extend the width of the heating area on the optical recording medium 35 in the direction perpendicular to the track direction. As a result, in the same manner as in the first embodiment, the range having a small temperature distribution difference in the heated area by the laser beam is extended to give a recorded domain having little shape disturbance at the end portion thereof and an improvement to the reproduction S/N ratio at the minute recording domain diameter not exceeding 1 $\mu$m.

In the present embodiment, an AO deflector such as of LiNbO$_3$ has been used as one a deflector for the laser beam. However, similar effect is obtainable by the use of an electro-optical deflector (EO deflector) of LiTaO$_3$ or the like.

What is claimed is:

1. A magneto-optical recording and reproducing apparatus for recording information on a magneto-optical recording medium and for reproducing the recorded information, comprising:
    a laser beam generating means for generating a laser beam;
    an optical syste for directing the laser beam onto said medium;
    a means for applying a magnetic field including a means for modulating said applied field with an information signal to be recorded on said medium;
    a means for oscillating the laser beam in a direction perpendicular to a direction of a track while said magnetic field is applied to said medium to record information; and
    a means for detecting a light beam reflected from or transmitted through said medium.

2. An apparatus according to claim 1, wherein said means for oscillating the laser beam comprises an acousto-optical deflector or an electro-optical deflector.

3. A method of recording information on a magneto-optical recording medium with a laser beam and a magnetic field, comprising:
    modulating the magnetic field with an information signal to be recorded;
    directing the laser beam onto a track of the medium to form on the track a beam spot where the medium is heated to form a heated domain while applying the modulated magnetic field to the heated domain to change the heated domain to a recorded domain corresponding to the information signal;
    oscillating the laser beam in a direction perpendicular to a direction of the track so as t widen an area of the recorded domain in the direction perpendicular to the direction of the track.

4. A magneto-optical recording and reproducing apparatus for recording information on a magneto-optical recording medium and for reproducing the recorded information, comprising:
    a laser beam generating means for generating a laser beam;
    a means for applying to said medium a magnetic field including a means for modulating said applied field with an information signal to be recorded;
    an optical system for directing the laser beam onto said medium to form on a track of said medium a beam spot where said medium is heated to form a heated domain, said magnetic field being applied to the heated domain to change the heated domain to a recorded domain corresponding to the information signal;
    a means for oscillating the laser beam in a direction perpendicular to a direction of the track so as to widen an area of said recorded domain in the direction perpendicular to the direction of the track; and
    a means for detecting a light beam reflected from or transmitted through said medium.

5. An apparatus according to claim 4, wherein said means for oscillating the laser beam comprises an ocousto-optical deflector or an electro-optical deflector.

6. A method of recording information on a magneto-optical recording medium with a laser beam and a magnetic field, comprising:
    modulating the magnetic field with an information signal to be recorded;
    directing the laser beam onto a track of said medium to form on the track a beam spot where the medium is heated to form a heated domain while applying the modulated magnetic field to the heated domain to change the heated domain to a recorded domain corresponding to the information signal;
    oscillating the laser beam in a direction perpendicular to a direction of the track at more than one cycle when a position of said beam spot on said medium moves in the direction of the track by a distance not exceeding 1 $\mu$m.

7. A magneto-optical recording and reproducing apparatus for recording information on a magneto-optical recording medium and for reproducing the recorded information, comprising:
    a laser beam generating means for generating a laser beam;
    a means for applying to said medium a magnetic field including a means for modulating said applied field with an information signal to be recorded;
    an optical system for directing the laser beam onto a track of said medium to form on the track a beam spot where said medium is heated to form a heated domain, said magnetic field being applied to the heated domain to change the heated domain to a recorded domain corresponding to the information signal;
    a means for oscillating the laser beam in a direction perpendicular to a direction of the track at more than one cycle when a position of said beam spot on said medium moves in the direction of the track by a distance not exceeding 1 $\mu$m; and
    a means for detecting a light beam reflected from or transmitted through said medium.

8. An apparatus according to claim 7, wherein said means for oscillating the laser beam comprises an acousto-optical deflector or an electro-optical deflector.

* * * * *